United States Patent [19]

Schmitt et al.

[11] 4,348,006

[45] Sep. 7, 1982

[54] PLASTIC VALVE ASSEMBLY

[75] Inventors: Edward L. Schmitt, Pittsburgh; Steven J. Caroleo, McKees Rocks; Charles W. Bolam; Richard W. Conley, both of Pittsburgh, all of Pa.

[73] Assignee: Kerotest Manufacturing Corp., Pittsburgh, Pa.

[21] Appl. No.: 224,203

[22] Filed: Jan. 12, 1981

Related U.S. Application Data

[63] Continuation of Ser. No. 58,785, Jul. 19, 1979, abandoned.

[51] Int. Cl.³ .............................................. F16K 1/226
[52] U.S. Cl. ................................... 251/288; 251/292; 251/297; 251/306; 251/308; 251/366
[58] Field of Search ............... 251/288, 297, 292, 306, 251/308, 315, 366

[56] References Cited

U.S. PATENT DOCUMENTS

| Re. 23,613 | 1/1953 | Danks | |
|---|---|---|---|
| 2,385,510 | 9/1945 | Harwood | |
| 2,657,896 | 11/1953 | Muller | |
| 2,863,630 | 12/1958 | Broz | 251/173 |
| 2,923,524 | 2/1960 | Fawkes | 251/306 |
| 2,936,778 | 5/1960 | Stillwagon | 251/306 |
| 2,939,674 | 2/1960 | Anderson | 251/173 |
| 3,051,435 | 8/1962 | Ramsey | 251/306 |
| 3,069,128 | 12/1962 | Grove | 251/173 |
| 3,072,139 | 1/1963 | Mosites | 251/306 |
| 3,084,715 | 4/1963 | Scharres | 137/601 |
| 3,095,177 | 6/1963 | Muller | 251/173 |
| 3,096,071 | 7/1963 | Fisher | 251/306 |
| 3,241,806 | 3/1966 | Snell, Jr. | 251/148 |
| 3,282,558 | 11/1966 | Swain | 251/174 |
| 3,304,050 | 2/1967 | Fawkes | 251/306 |
| 3,311,128 | 3/1967 | Taylor | 137/383 |
| 3,447,780 | 6/1969 | Hobson, Jr. | 251/306 |
| 3,473,784 | 10/1969 | Radford | 251/306 |
| 3,502,299 | 3/1970 | Phillips | 251/306 |
| 3,525,499 | 8/1970 | Geiselman et al. | 251/306 |
| 3,526,386 | 9/1970 | Gachot | 251/366 |
| 3,537,683 | 11/1970 | Snell, Jr. | 251/306 |
| 3,565,395 | 2/1971 | Hansen | 251/306 |
| 3,589,678 | 6/1971 | Magoon | 251/306 |
| 3,595,523 | 7/1971 | Fezton | 251/306 |
| 3,612,483 | 1/1971 | Pool | 251/306 |
| 3,633,872 | 1/1972 | Wright | 251/306 |
| 3,647,180 | 3/1972 | Church | 251/306 |
| 3,666,233 | 5/1972 | Scaramucci | 251/306 |
| 3,667,726 | 6/1972 | Church et al. | 251/306 |
| 3,675,888 | 7/1972 | Scaramucci | 251/306 |
| 3,698,686 | 10/1972 | Williams | 251/306 |
| 3,771,764 | 11/1972 | Miyauchi | 251/306 |
| 3,782,684 | 1/1974 | Stephens et al. | 251/306 |
| 3,784,157 | 1/1974 | Wenglar | 251/306 |
| 3,790,130 | 2/1974 | Getty, Jr. | 251/306 |
| 3,827,671 | 8/1974 | Bolden et al. | 251/297 |
| 3,940,108 | 2/1976 | Edwards | 251/306 |
| 3,986,699 | 10/1976 | Wucik, Jr. et al. | 251/173 |
| 3,991,974 | 11/1976 | Bonafous | 251/306 |
| 4,006,882 | 2/1977 | Bonafous | 251/306 |
| 4,025,050 | 5/1977 | Manki et al. | 251/306 |
| 4,036,468 | 7/1977 | Webb | 251/307 |
| 4,038,358 | 7/1977 | Wrasman | 264/242 |
| 4,072,161 | 2/1978 | Schoeneweis et al. | 251/315 |
| 4,109,837 | 8/1978 | Taylor | 251/308 |
| 4,176,823 | 12/1979 | Gliates | 251/308 |
| 4,188,012 | 2/1980 | Johnson | 251/308 |

FOREIGN PATENT DOCUMENTS

| 58630 | 6/1973 | Australia . | |
|---|---|---|---|
| 2849779 | 5/1979 | Fed. Rep. of Germany | 251/306 |
| 2079571 | 5/1970 | France . | |
| 2117959 | 12/1971 | France . | |
| 955194 | 2/1962 | United Kingdom . | |

*Primary Examiner*—H. Jay Spiegel
*Attorney, Agent, or Firm*—Stanley J. Price, Jr.; John M. Adams

[57] ABSTRACT

A molded polyethylene valve body has a conduit portion and an annular portion extending upwardly from the conduit portion. A passageway extends through the conduit portion for the conveyance of fluid. A valve seat is formed in the conduit portion by a metal sleeve that is molded in the valve body to prevent separation of the sleeve from the valve body during sustained pressures. O-rings positioned in grooves around the metal sleeve are compressed by the plastic material during the molding process to effect a seal between the sleeve and the plastic valve body. An annular rubber sleeve insert is vulcanized onto the inner diameter portion of the metal sleeve. A plastic valve disc is centrally positioned in the conduit portion within the periphery of the rubber sleeve insert and is arranged to sealingly engage the rubber sleeve insert when the valve is moved to the closed position. A metal stem extends through the annular portion of the valve body and is connected to the valve disc. The upper end of the metal valve stem is molded into an actuator. The actuator is sealingly connected to the annular portion of the valve body so as to maintain the actuator on the valve body in the event that the pressure seal between the valve disc and the valve body is destroyed.

20 Claims, 8 Drawing Figures

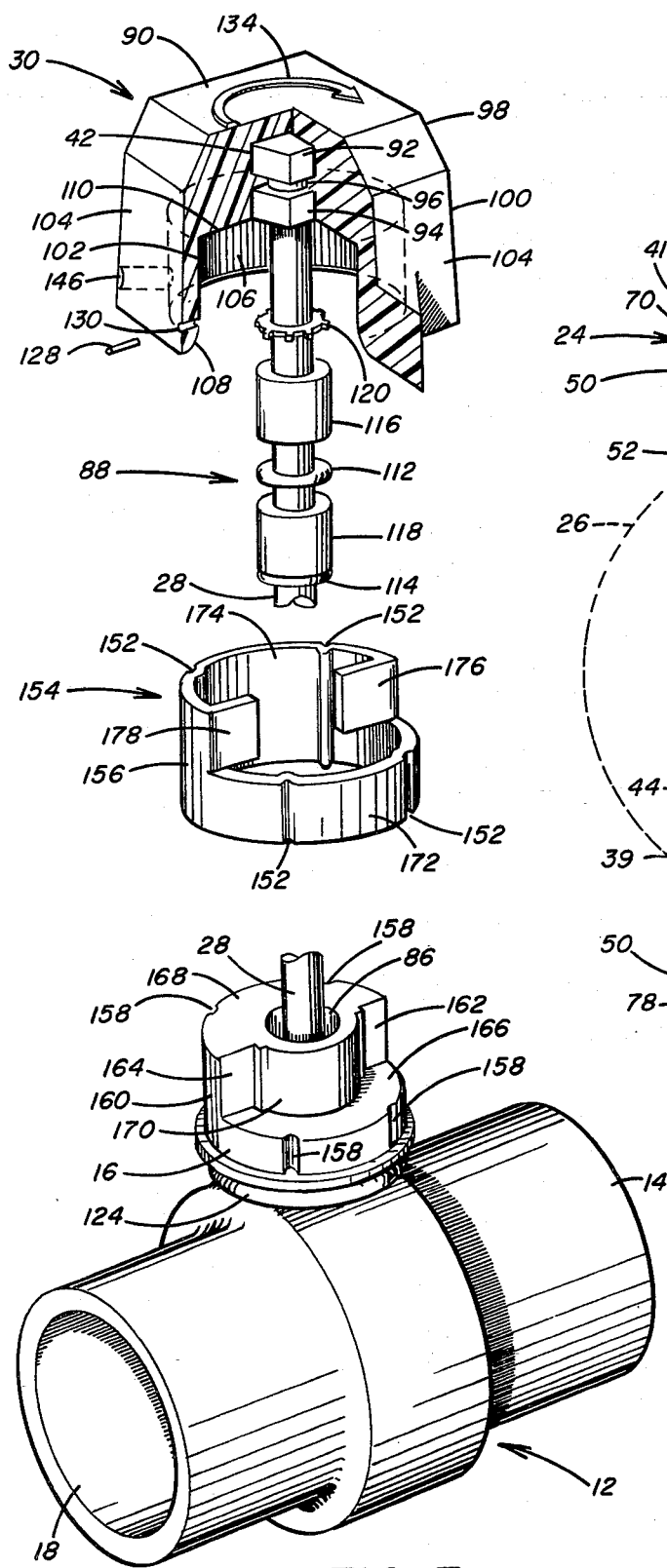
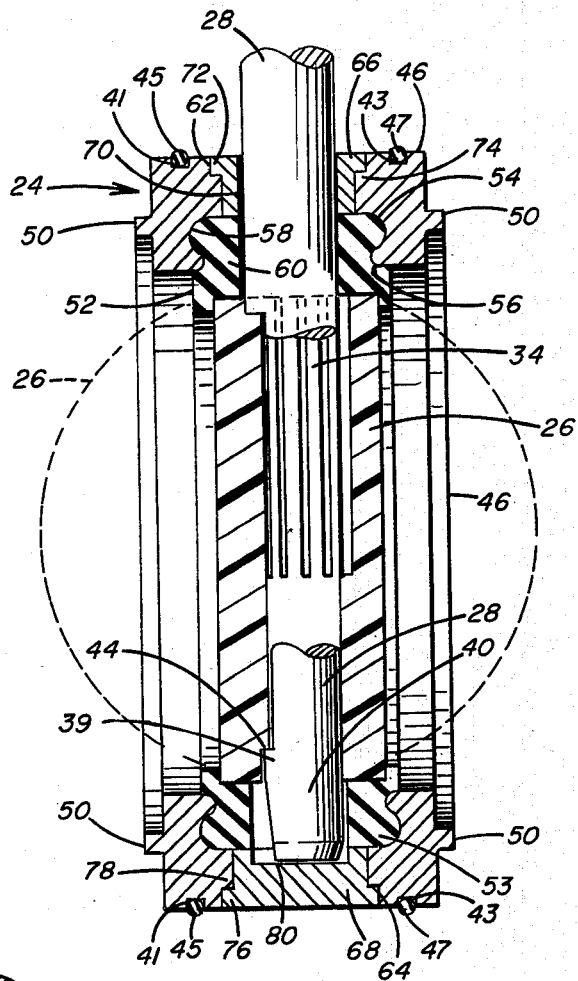
FIG. 7
FIG. 8

PLASTIC VALVE ASSEMBLY

CROSS REFERENCE TO RELATED APPLICATION

This application is a continuation of copending application Ser. No. 58,785 filed July 19, 1979, now abandoned, entitled "Plastic Valve Assembly" by Edward L. Schmitt et al.

BACKGROUND OF THE INVENTION

1. Field of the Invention

This invention relates to a plastic valve assembly and more particularly to a butterfly-type valve having a plastic body portion with a valve seat formed by a metal sleeve molded within and sealed to the plastic valve body with an annular rubber sleeve insert vulcanized to the metal sleeve and arranged to receive a rotatable valve disc movable into and out of sealing engagement with the rubber sleeve insert to close and open the valve assembly.

2. Description of the Prior Art

Butterfly valves are well known in the art and conventionally include a valve housing or body portion within which an annular elastomeric seat is mounted for the purpose of effecting a resilient seal against a pivotal valve disc. The disc is rotatable from an open position, aligned with the direction of fluid flow through the valve, to a closed position at right angles to the direction of flow. In the closed position, the peripheral edge of the disc tightly engages the valve seat to effect a seal. In the conventional butterfly valve, the valve seat is molded of an elastomeric material to provide it with a limited degree of resilience. When the valve disc is rotated to a closed position, it abuts the valve seat in an interference fit to effect a fluid tight seal between the valve disc and the valve seat.

The need for a certain degree of resilience, and thus displaceability of the valve seat necessitates the use of an elastomeric material. Materials of this type have a tendency to creep or migrate when subjected to high pressure, particularly when the pressure is applied to the seat on one side of the disc without a corresponding supporting pressure on the other side of the disc. The need to control this migration or creep without sacrifice of the necessary resilience of the elastomeric material has caused the industry to adopt the use of reinforcing members in the seat. These reinforcing members are rigid and provide support for the elastomeric valve seat limiting its ability to creep or migrate.

One arrangement for reinforcing the elastomeric valve seat is an annular ring or band of rigid material embedded within the seat as the seat is molded. It is important that this reinforcement be accurately positioned within the seat if the seat is to have uniformity of strength and accurate control of deflection, migration, and creep is to be maintained. During the process of molding the valve seat, the elastomeric material is injected into the mold at high pressures. This tends not only to deflect but also to displace the reinforcement member and thus mislocate it within the seat. This results in a defective seat.

U.S. Pat. No. 3,537,683 attempts to resolve this problem by modifying a conventional mold for a valve seat by the addition of lateral pins. With this arrangement openings are provided in the valve seat which extend from the outer periphery of the valve seat through the reinforcement member. However, this arrangement is known to result in leakage under certain circumstances requiring that the openings be plugged to prevent leakage. Even if plugging is not effective, an opening is created through the reinforcement member thus permitting differential deflection of the seat at the hole because the plug cannot provide the same uniformity of support as would a continuous, uninterrupted reinforcement member.

An example of another approach to solving the problem of reinforcing the valve seat to prevent creeping is disclosed in U.S. Pat. No. 3,595,523. There a rubber valve seat is backed up by a plastic retaining ring which is mounted to the plastic housing by screws. Molded reinforcement members for conduits are also known. In U.S. Pat. No. 3,526,386 a T-connection for a piping system is disclosed and includes an annular body portion and a pair of coaxially aligned tubular branches. The body portions are fabricated of plastic material, and a metallic sleeve is molded within each tubular branch when the valve body portions are formed to reinforce the branch.

U.S. Pat. Nos. 3,241,806; 3,502,299; 3,589,678; 3,647,180; 3,667,726; 3,771,764; 4,006,882; 4,025,050 and 4,036,468 disclose butterfly valves having metallic body portions with composite valve seats formed of various materials, i.e., metallic and nonmetallic.

It is also know in the art to provide a metallic butterfly valve with a metallic ring secured to the metallic valve housing with a resilient liner retained within the metallic ring. In U.S. Pat. No. 2,923,524 the retaining ring is formed by a plurality of arcuate segments. In U.S. Pat. No. 3,473,784 a Teflon liner is supported in the valve housing by a steel ring. In U.S. Pat. No. 3,525,499 a stainless steel ring is fused to the metal valve body by casting. U.S. Pat. No. 3,612,483 discloses a rigid metal Stellite seat bonded to a valve body.

In U.S. Pat. No. 3,940,108 a reinforcement ring is disclosed for a butterfly valve having a metallic body portion. The valve seat is a molded member formed by an annular, rigid reinforcement ring embedded in a body of molded elastomeric material. Support projections are provided on the reinforcement ring to support the ring accurately in place within a mold while the elastomeric material is injected into the mold and surrounding the ring.

Still further butterfly valves are disclosed and described in the following U.S. Pat. Nos. 3,311,128; 3,447,780; 3,633,872; 3,675,888; 3,782,684; and 3,790,130.

While it has been suggested to provide reinforcing members for the elastomeric seat ring for a butterfly valve, the known arrangements have been considered ineffective to develop a seal directly on a valve body of polyethylene. Therefore, there is need for a butterfly valve fabricated of a plastic material in which a fluid tight seal is maintained between the valve body and the valve closure member and is not subject to creeping of the polyethylene valve body from the valve closure member producing a radial gap around the closure member resulting in leakage of the butterfly valve when the valve closure member is moved to a closed position.

SUMMARY OF THE INVENTION

In accordance with the present invention, there is provided a valve assembly that includes a valve body of plastic material. The valve body has a conduit portion and an annular portion extending upwardly from the conduit portion. A passageway extends through the conduit portion for the conveyance of fluid through the conduit portion. A valve seat is positioned in the passageway and is secured to the conduit portion surrounding the passageway. The valve seat includes a metallic sleeve member molded in sealing relation to the conduit portion of the plastic valve body. Means is provided for locking the metallic sleeve member to the conduit portion of the plastic valve body to prevent separation of the metallic sleeve member from the plastic valve body during sustained fluid pressure in the passageway. An annular resilient sleeve insert is secured to the metallic sleeve member and positioned within the passageway. A valve disc is centrally positioned in the conduit portion for movement into and out of sealing engagement with the annular resilient sleeve insert to effect closing and opening of the valve assembly. An actuator device is supported by the valve body annular portion and is connected to the valve disc for moving the valve disc between an open position permitting fluid flow thorugh the passageway and a closed position sealingly engaging the valve disc with the annular resilient sleeve insert to interrupt fluid flow through the passageway.

A valve stem rotatably supports the valve disc in the conduit portion. The valve stem includes an upper end portion molded within the actuator device, which is preferably fabricated of plastic material. Adhesive is injected into longitudinal grooves provided in the valve disc to serve as a secondary means of connecting the valve disc to the valve stem. This arrangement also increases the strength of the connection of the valve disc to the valve stem. O-ring seals surround the upper portion of the valve stem in the valve body annular portion. The O-rings are separated by rigid spacers and are held in place around the valve stem by a retaining ring which is positioned at the upper end of the valve stem. The upper end portion of the valve stem has a hexagonal configuration which is operable to prevent ejection of the O-ring seals from the valve assembly in the event that the retaining ring is forced from its operative position.

The upper end of the valve stem is molded into the actuator device which is provided with a directional arrow for indicating the direction for turning the valve to a selected one of the valve positions. For the open position, the actuator indicator is in line with the direction of flow through the conduit portion and in the closed position the actuator indicator is normal to the direction of flow through the conduit portion. A ball plunger penetrates the actuator and rides on a metal sleeve-like support which surrounds the outside of the annular portion of the valve body. The sleeve-like support includes a plurality of radially spaced, longitudinally extending indentations or stops for receiving the ball plunger to retain the disc in either the open or closed position.

The metal sleeve-like support is installed on the valve body annular portion after the valve body is molded. The metal support is provided with tabs which are embedded into the plastic material of the valve body annular portion. The tabs serve to strengthen the stops on the valve body so as to limit the valve actuator device to 90° operation. The valve body annular portion is also provided with stops that engage the stops of the metal sleeve support.

The metal sleeve support is further operable to distribute the rotational force of the actuator device over the entire surface area of the valve body annular portion. This serves to strengthen the annular portion without requiring excessive amounts of material to be added to this area of the valve body. In the event that the actuator device is over-torqued, the actuator stops fail but the actuator continues to operate to provide 360° operation without failure of the pressure boundary. Thus with this arrangement, the metal sleeve-like support is operable to withstand the torque which will cause actuator stop failure.

Accordingly, the principal object of the present invention is to provide a plastic valve assembly having a metallic sleeve molded and sealed to the plastic valve body with a rubber sleever insert vulcanized to the metal sleeve to provide a fluid tight seal between the valve disc and the valve body that overcomes creeping or separation of the plastic valve body from the valve seat resulting in leakage of the valve.

Another object of the present invention is to provide a butterfly valve assembly having a valve body fabricated of plastic material that is directly heat fusable to plastic conduit without need for transition fittings and including a metallic valve stem molded to a plastic valve actuator for controlling the position of the valve closure member where the valve actuator is connected to the valve body in a manner that insures that the valve actuator and valve stem will not be disengaged from the valve body in the event the valve closure member fails.

A further object of the present invention is to provide in a butterfly valve assembly, an arrangement for sealingly connecting the valve actuator to the valve body so that if the valve closure member should be destroyed and the valve stem is released from engagement with the valve closure member than valve pressure boundary will not be violated.

These and other objects of the present invention will be more completely disclosed and described in the following specification, the accompanying drawings and the appended claims.

BRIEF DESCRIPTION OF THE DRAWINGS

FIG. 7 is an exploded isometric view of the valve actuator and the valve body, illustrating a seal assembly surrounding the upper portion of the valve stem within the annular portion of the valve body.

FIG. 8 is an enlarged fragmentary sectional view of the valve disc in a closed position in the valve body conduit portion, illustrating the connection of the valve disc to the valve stem.

DESCRIPTION OF THE PREFERRED EMBODIMENT

Figure 1:
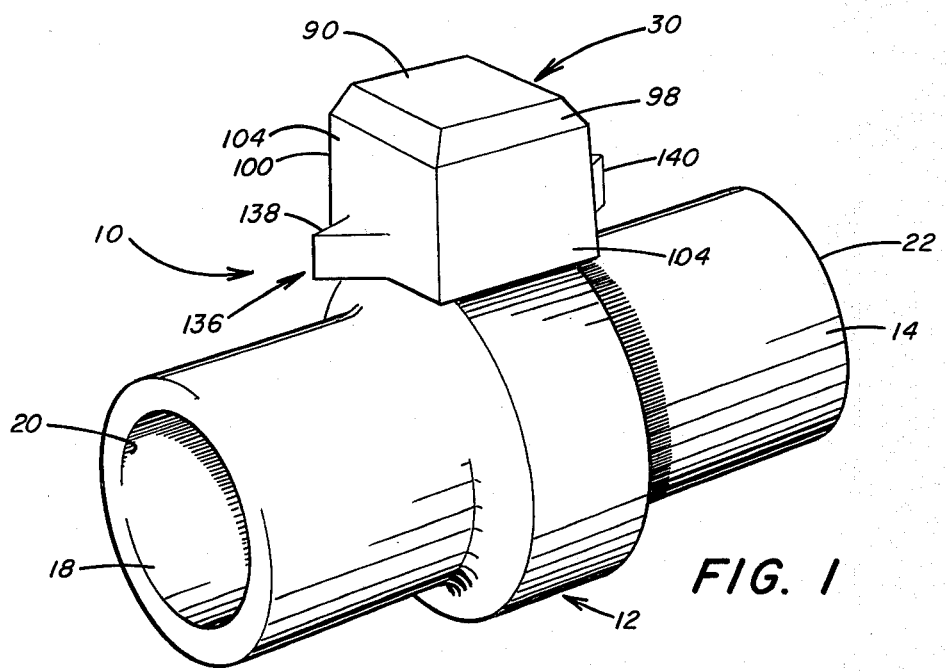
FIG. 1 is an isometric view of the valve assembly, illustrating a valve actuator mounted on a molded polyethylene valve body.

Referring to the drawings and particularly to FIGS. 1, 2, 5 and 6, there is illustrated a valve assembly generally designated by the numeral 10 of the butterfly-type which is adaptable for use as a distribution valve or service stop for controlling the flow of a fluid, either a liquid or a gas through a piping system. The valve assembly 10 includes a valve body generally designated by the numeral 12 having a conduit portion 14 and an annular portion 16 formed integral with the conduit portion and extending upwardly therefrom. The valve body 12 is fabricated by conventionally known molding processes of plastic material, such as polyethylene and the like. A passageway 18 extends through the conduit portion 14. The passageway 18 includes opposite end portions 20 and 22 that are adaptable for connection to plastic service conduits by directly heat fusing the plastic valve assembly to the conduits whereby the valve assembly is operable to control the flow of fluid, such as natural gas, from one service conduit connected to end portion 20 to another service conduit connected to end portion 22.

Figure 2:
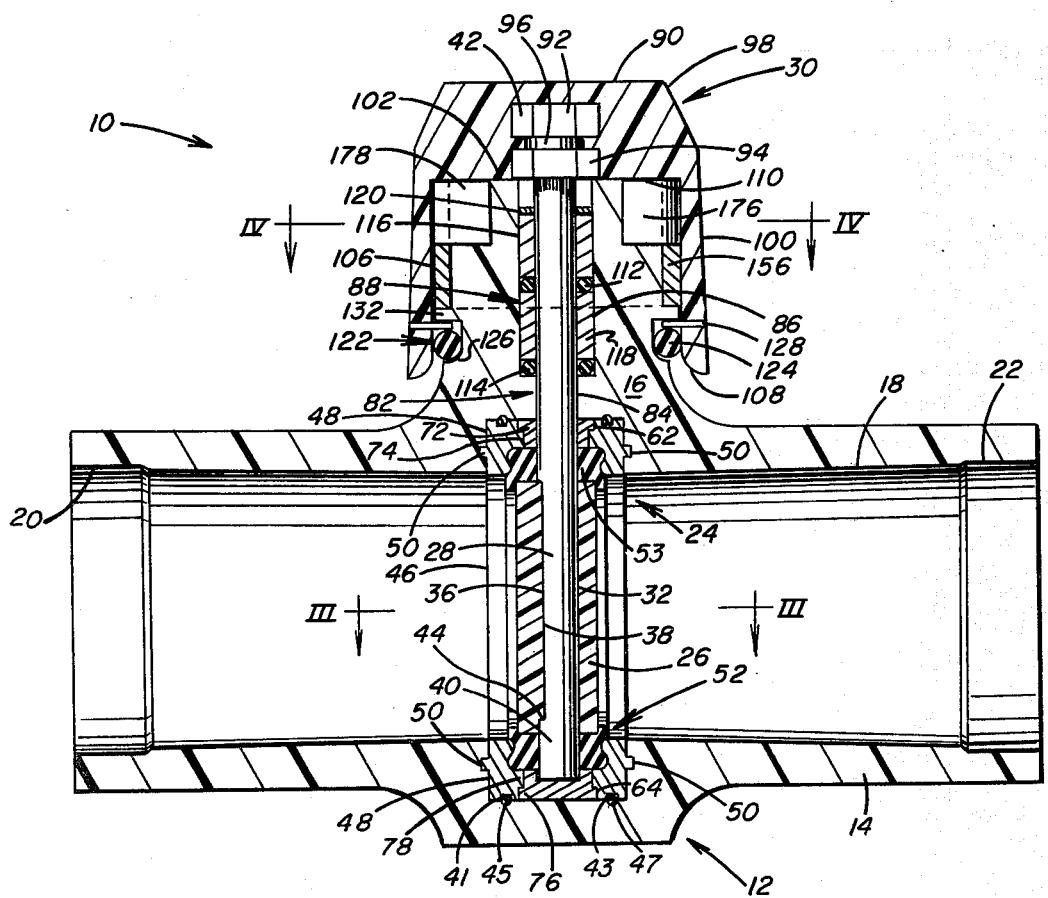
FIG. 2 is a sectional view of the valve assembly, illustrating a metal sleeve molded to the valve body with a resilient elastomeric sleeve insert vulcanized to the metal sleeve.
Figure 3:
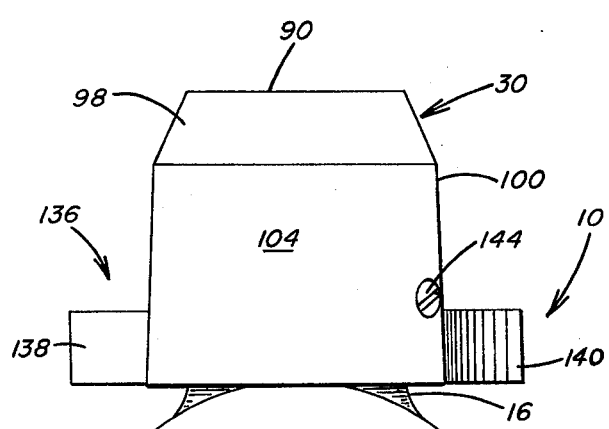
FIG. 3 is a sectional view taken along line III—III of FIG. 2, illustrating a plastic valve disc in a closed position abutting the elastomeric sleeve insert.
Figure 3:
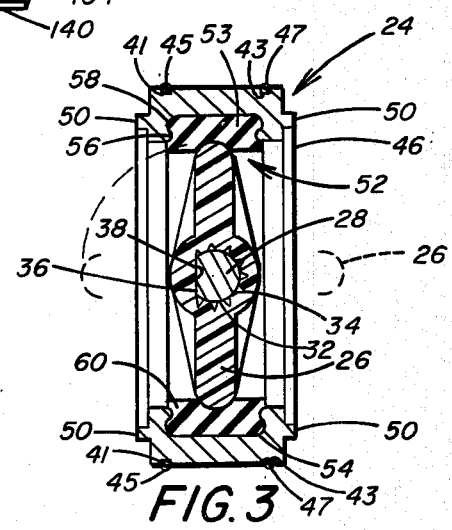
Figure 5:
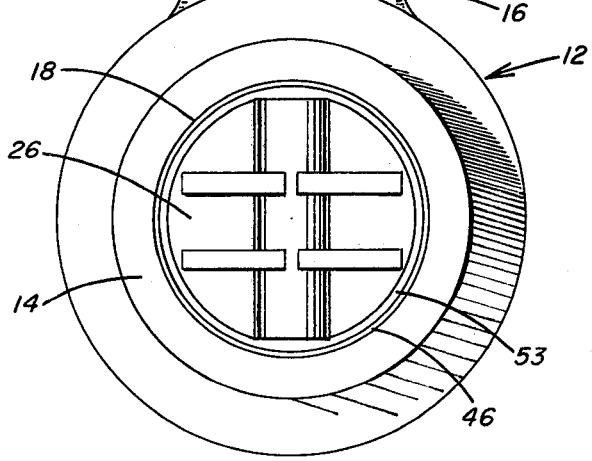
FIG. 5 is an end view of the valve assembly, illustrating the valve disc in a closed position in the conduit portion of the valve body.

The valve assembly 10 also includes a valve seat assembly generally designated by the numeral 24 in FIG. 2 and illustrated in greater detail in FIGS. 3 and 8. A rotatably mounted butterfly disc 26, also fabricated of plastic material, is connected to a valve stem 28 that is rotated by a valve actuator generally designated by the numeral 30. The valve actuator 30 is operable to move the disc 26 between a closed position, as illustrated by the solid lines in FIG. 3, sealingly engaging the seat assembly 24 and an open position, as illustrated by the dotted lines in FIG. 3, displaced from sealing engagement with the seat assembly 24. The valve stem 28 is preferably a metallic member and is suitably secured as by molding to the plastic valve actuator 30, as will be explained hereinafter in greater detail.

The valve disc 26 is centrally positioned in the conduit portion 14 of the valve body 12. The valve disc 26 has an arcuate configuration and includes a longitudinal bore 32 passing axially through the disc 26. Communicating with the longitudinal bore 32 are a plurality of radially extending longitudinal grooves 34 in the disc 26, as illustrated in FIG. 3. A portion of the disc bore 32 is provided with a flat 36 extending the length of the bore 32. The valve stem 28 extends through the disc bore 32 and is provided with a flat 38 operable to engage the flat 36 of the disc bore 32.

The valve stem 28 also includes a wedge-shaped lower end portion 40 having a shoulder 39 and a hexagonal-shaped enlarged upper end portion 42. The disc bore 32 at the lower end portion thereof includes a shoulder portion 44. With this arrangement when valve stem 28 is inserted within the disc bore 32, the shoulder 39 of the wedge-shaped end portion 40 of stem 28 engages the shoulder 44 of the disc 26. The connection, together with the mating engagement of the stem flat 38 with the disc flat 36, insures that the stem 28 is nonrotatably connected to the disc 26. This arrangement prevents the stem 28 from being forced out of the valve body 12 during service. In addition, suitable adhesive material is injected into the longitudinal grooves 34 of the disc bore 32 surrounding the valve stem 28 to further nonrotatably connect the stem 28 to the valve disc 26.

As illustrated in FIG. 2, the seat assembly 24 includes a metallic sleeve member 46 that is arranged to be received within an annular recess 48 of the valve body conduit portion 14. In accordance with the present invention during molding of the valve body 12, the metallic sleeve member 46 is positioned in the core of the molds for forming the valve body 12 and polyethylene is injected into the mold core surrounding the metallic sleeve 46. In this manner the metallic sleeve 46 is secured to the valve body 12 during molding of the valve body 12.

A seal arrangement between the metallic sleeve member 46 and the plastic valve body 12 is also provided, as illustrated in FIGS. 2, 3 and 8 in accordance with the present invention to prevent leakage between the metallic sleeve member and the plastic valve body. This is accomplished by the provision of a pair of circumferential grooves 41 and 43 on the outer peripheral edge of metallic sleeve 46. The grooves 41 and 43 are equally spaced from the vertical centerline of the metallic sleeve 46. The grooves 41 and 43 are arranged to receive O-rings 45 and 47 respectively. Prior to molding the plastic valve body 12 around the metallic sleeve 46, the O-rings 45 and 47 are positioned in the circumferential grooves 41 and 43. Preferably, the O-rings 45 and 47 are undersized thereby requiring stretching or expanding the resilient material forming the O-rings 45 and 47 to position them in the grooves 41 and 43. In this manner the O-rings 41 and 43 are securely positioned in the grooves 41 and 43 to grip the body portion of the metallic sleeve 46.

Thus, during the molding of the plastic valve body 12, the O-rings 45 and 47 are compressed by the plastic material to securely retain the O-rings in the grooves 41 and 43. This prevents displacement of the O-rings from the grooves as plastic material is injected under elevated pressure into the mold and into surrounding relation with the metallic sleeve 46 and O-rings 45 and 47. By forming the plastic valve body 12 around the metallic sleeve 46 in this manner, the sleeve 46 is molded to the valve body 12 and the O-rings 45 and 47 are embedded into the plastic valve body 12, as illustrated in FIGS. 2, 3 and 8. As a result of this seal arrangement, a fluid tight seal is formed between the plastic valve body 12 and the metallic sleeve 46. This enhances the seal between the metallic sleeve 46 and the plastic valve body 12 to prevent fluid from leaking between the sleeve 46 and the valve body 12.

The sleeve member 46 also includes annular protrusions or ribs 50 that extend around the upper and lower end portions of the sleeve member 46. The protrusions 50 serve to lock the polyethylene valve body 12 onto the metallic sleeve member 46 to prevent separation or creeping of the surface of the valve body 12 away from the surface of the metallic sleeve 46. This arrangement is particularly effective to maintain engagement of the metal sleeve 46 with the plastic valve body 12 during sustained periods of fluid flow through the valve assembly 10 at elevated temperatures.

The metal sleeve member 46 serves as a reinforcing member for a resilient valve seat generally designated by the numeral 52 in FIGS. 2, 3 and 8. Preferably, the valve seat 52 is an elastomeric insert 53 vulcanized within metal sleeve 46 and is fabricated from a material, such as rubber. Thus, when the valve actuator 30 is rotated to turn the valve disc 26 to the closed position, the valve seat 52 having a limited degree of resilience will be engaged by the outer peripheral surface of the disc 26 to effect a fluid tight seal between the disc 26 and the seat 52 by an interference fit of the disc 26 with the seat 52.

Most preferably, the annular elastomeric insert 53 is vulcanized to the inner diameter of the metallic sleeve member 46 prior to insertion of the metallic sleeve member 46 in the valve body 12 when the valve body 12 is molded. By vulcanizing the elastomeric insert 53 to the metallic sleeve 46, fluid leakage is prevented between the elastomeric insert 53 and the inner diameter of the metallic sleeve 46. As illustrated in greater detail in FIG. 8, the metallic sleeve member 46 is provided with an inner diameter portion 54 having a constricted opening 56 for receiving the rubber insert 53. The insert 53 has an outer diameter 58 that protrudes outwardly from an annular constricted portion 60. The outer diameter portion 58 of insert 53 is arranged to engage in abutting relation the surface of the inner diameter portion 54 of sleeve member 46. With this arrangement the insert 53 is locked into engagement with the inner diameter portion 54 of metal sleeve member 46. By locking the elastomeric insert 53 to the metallic sleeve member 46 as above described in addition to vulcanizing the insert 53 to the sleeve member 46, a valve seat 52 is formed that is securely reinforced by the metallic sleeve member 46 to prevent separation and distortion of the valve seat 52 from its annular configuration at elevated pressures.

The metallic sleeve member 46 includes an upper opening 62 and a lower opening 64 through which the valve stem 28 extends. Positioned within the openings 62 and 64 surrounding the valve stem 28 are a pair of bushings 66 and 68. Preferably, the bushings 66 and 68 are fabricated of silicone bronze. The bushing 66 is provided with a bore 70 that extends entirely through the bushing 66. An external shoulder 72 on bushing 66 is arranged to engage an internal shoulder 74 of the metallic sleeve member 46 to thereby secure the bushing 66 in place within the valve body 12.

The valve stem 28 extends through the bore 70 of bushing 66 and is rotatable relative thereto. The bushing 68 at the opposite end of the sleeve member 46 is provided with an outer shoulder 76 arranged to securely engage an internal shoulder 78 of the sleeve member 46. The bushing 68 includes a recess 80 which is adapted to rotatably support the valve stem wedge-shaped end portion 40.

The valve stem 28 is preferably fabricated of stainless steel and as above discussed extends through the valve body annular portion 16 and the butterfly disc 26 and is rotatably supported by the seat assembly 24. To receive the valve stem 28, the annular portion 16 is provided with a bore generally designated by the numeral 82 as illustrated in FIG. 2. The bore 82 includes a reduced diameter portion 84 and an enlarged diameter portion 86. The reduced diameter portion 84 is positioned in abutting relation with the valve stem 28. A seal assembly generally designated by the numeral 88 is positioned between the valve body annular portion 16 and the valve stem 28 to provide a fluid and pressure tight seal therebetween.

As above discussed, the enlarged upper end portion 42 of the valve stem 28 is secured by molding to the valve actuator 30. The valve actuator 30 as illustrated in FIGS. 1, 2, 4, 5, 6 and 7 includes a cap 90 fabricated of plastic material preferably. To effect a secure engagement of the valve stem enlarged end portion 42 to the cap 90, the end portion 42 is formed by a pair of hexagonal sections 92 and 94 which are separated from one another by a connecting portion 96 of a reduced diameter. The hexagonal sections 92 and 94 are molded to the polyethylene cap during fabrication of the cap 90 prior to insertion of the valve stem 28 in the valve body 12. This secures the valve stem 28 to the cap 90.

Figure 6:
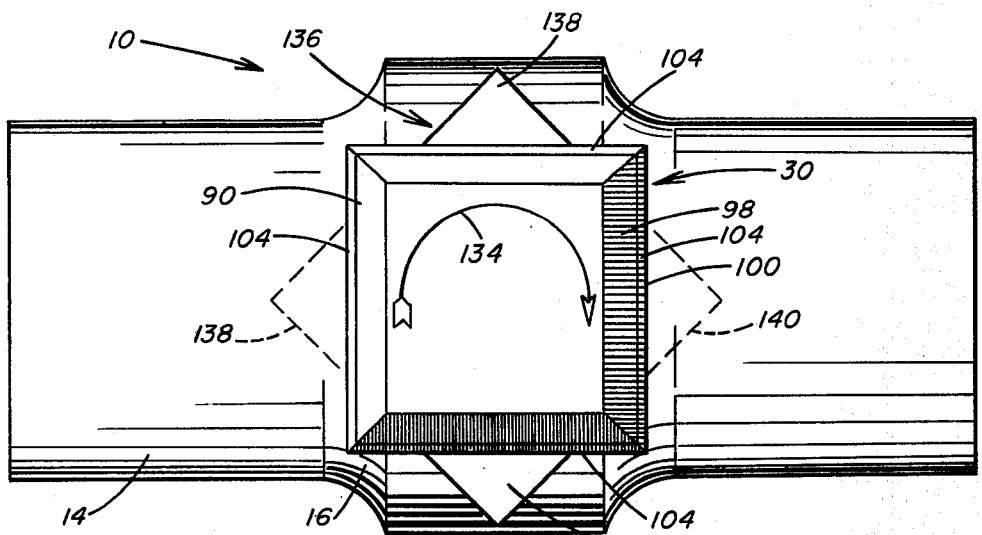
FIG. 6 is a top plan view of the valve assembly, illustrating a directional arrow for indicating the direction for turning the actuator to open or close the valve.

The cap 90 has a tapered end portion 98 that extends upwardly from a cup-shaped body portion 100 having a recess 102 that is positioned in surrounding relation with the valve body annular portion 16. The body portion 100, as illustrated in FIGS. 1, 6 and 7, includes a plurality of planar faces 104 positioned oppositely of the annular inner surface 106 that surrounds the valve body annular portion 16 in spaced relation thereto. The cap 90 has an open end portion 108, as illustrated in FIGS. 2 and 7 to receive the annular portion 16 and a closed end portion 110 to receive the top surface of the annular portion 16. With this arrangement, the cap 90 of the valve actuator 30 is rotatably mounted on the valve body annular portion 16.

Positioned below the enlarged end portion 42 and the valve cap 90 in surrounding relation with the valve stem 28 in the valve body annular portion 16 is the seal assembly 88. The seal assembly 88 includes a pair of elastomeric O-rings 112 and 114 that are positioned within the enlarged diameter portion 86 of the passageway 82 through the annular portion 16. The O-rings 112 and 114 are maintained in spaced relation by a pair of tubular spacers 116 and 118 that are also preferably fabricated of plastic material. The spacers 116 and 118 are each positioned in abutting relation at their inner cylindrical surface with the valve stem 28 and at their outer cylindrical surface with the annular portion 16.

The spacers 116 and 118 are retained in position within the annular portion 16 by an O-ring retainer 120 that is preferably formed of stainless steel. The O-ring retainer includes an outer edge formed of a plurality of prongs which are embedded within the body of the annular portion 16 to thereby secure the retainer 120 to the annular portion 16. Thus with this arrangement, the seal assembly 88 is securely retained in the valve body annular portion 16 in surrounding relation with the valve stem 28 to prevent leakage of fluid upwardly through the annular portion 16 around the valve stem 28. This is particularly important in the event of failure of the valve disc 26 to prevent the escape of fluid from the valve assembly 10 around the upper end of the valve stem 28.

Further, in accordance with the present invention, a weather seal assembly generally designated by the numeral 122 in FIG. 2 is provided between the valve actuator 30 and the valve body annular portion 16. The weather seal assembly 122 is formed by an O-ring 124, also illustrated in FIG. 7, that is received within an external groove 126 on the valve body annular portion 16 opposite the open end 108 of actuator gap 90. The annular inner surface 106 of the cap 90 is positioned in abutting relation with the O-ring 124 to seal the opening between the open end portion 108 of cap 90 and the valve body annular portion 16.

To serve as a secondary means of retaining the valve actuator cap 90 on the valve body annular portion 16, a plurality of pins 128 are arranged to extend through apertures 130 of the cap 90. The apertures 130 are positioned oppositely of the external groove 26 above the O-ring 124. With this arrangement, the pins 128 extend through the apertures 130 and are wedged into frictional engagement with the O-ring 124 and a shoulder 132 of the valve body annular portion 16 formed above the external groove 126. In the event that the butterfly disc 26 should be destroyed thereby releasing the valve stem 28 from the disc 26, the valve actuator 30 would not be expelled from the valve body 12. Consequently, with this arrangement, the fluid seal provided by the assembly 88 between the annular portion 16 and the valve stem 28 would not be destroyed. This secondary retaining assembly insures that the valve actuator 30 is maintained secured to the valve body 12.

Figure 4:
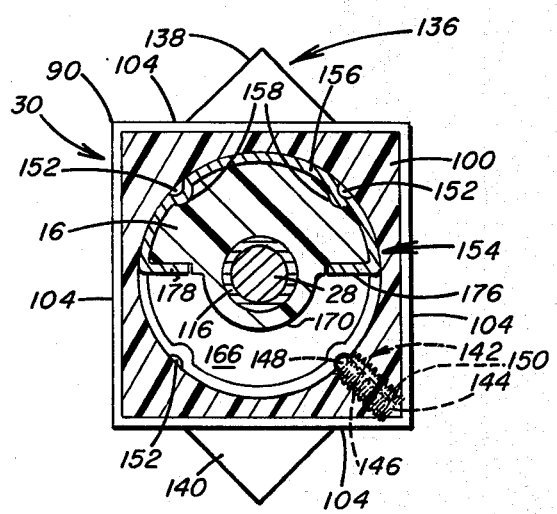
FIG. 4 is a sectional view taken along line IV—IV of FIG. 2, illustrating the valve actuator with a ball plunger penetrating the actuator and riding on a metal sleeve support surrounding the annular portion of the valve body.

Referring to FIGS. 4, 6 and 7 there is illustrated in detail the valve actuator 30 that as above discussed is operable to control the position of the valve disc 26 relative to the seat assembly 24. By the rigid connection of the valve stem upper end portion 42 to the actuator cap 90, rotation of the actuator cap 90 turns the valve stem 28 within the bushings 66 and 68 to rotate the disc 26 from the closed position, as indicated by the solid lines in FIG. 3. In the closed position the disc 26 sealingly engages the elastomeric sleeve insert 53 that forms the valve seat 52 of the valve assembly 10. In the closed position fluid flow across the boundary of the disc 26 is prevented.

By rotating the actuator cap 90 through an angle of 90°, the valve disc 24 is moved from its interference fit with the insert 53 to the dotted position, as illustrated in FIG. 3. In this position the disc 26 is no longer positioned normal to the direction of fluid flow but is in line with the direction of fluid flow to permit fluid to pass through the conduit portion 14 past the valve seat 52. The actuator cap 90 includes a directional arrow 134 as illustrated in FIGS. 6 and 7 for indicating the direction to turn the cap 90 to move the disc 26 to the closed position. The cap 90 also includes a position indicator device generally designated by the numeral 136 and illustrated in FIGS. 1, 4, 5 and 6.

The position indicator device 136 preferably includes a pair of protrusions 138 and 140 that extend outwardly from oppositely positioned planar faces 104 of the cap body portion 100. When the valve disc 26 is in the closed position, the protrusions 138 and 140 are normal to the direction of flow through the conduit portion 14, as illustrated by the solid lines in FIG. 6. Accordingly, when the valve disc 28 is in the open position, the protrusions 138 and 140 are in line with the direction of fluid flow through the conduit portion 14, as indicated by the dotted lines in FIG. 6.

Referring to FIG. 4, there is illustrated the arrangement for maintaining the valve disc 26 in either the open or closed position by locking the position of the actuator cap 90 on the valve body annular portion 16. This is provided by a spring actuated device generally designated by the numeral 142 which includes a ball-type plunger 144 that extends through an aperture 146 of the actuator cap 90 as illustrated in FIG. 4. A ball 148 is positioned on the end of plunger 144 and is spring biased outwardly from the plunger 144 by a compression spring 150.

The ball 148 is arranged to be received within one of a plurality of longitudinally extending grooves or recesses 152 radially spaced on the outer periphery of an annular support member generally designated by the numeral 154 in FIGS. 4 and 7. The support member 154 is preferably a rigid metallic sleeve-like member 156 which surrounds the outer surface of the valve body annular portion 16. The annular portion 16 has a plurality of longitudinally extending grooves 158 that are arranged to receive the grooves or recesses 152 of the metal sleeve 156 so as to securely and nonrotatably engage the annular support member 154 to the valve body annular portion 16.

Further, as illustrated in FIG. 7, the annular portion 16 has an upper end portion 160 having vertical planar faces 162 and 164 separating horizontal planar faces 166 and 168. Separating the planar vertical surfaces 162 and 164 is an arcuate portion 170 which surrounds the portion of the valve stem 28 that extends through the bore 82 of the annular portion 16. With this configuration of the annular portion upper end 160, the metal sleeve 156 is provided with a lower annular portion 172 separated from an upper semiannular portion 174 by a pair of tabs 176 and 178 that extend diametrically from the semiannular portion 174 and are spaced from one another.

The tabs 176 and 178 are arranged in abutting relation with the faces 162 and 164 and secured thereto to thereby lock the metal sleeve 156 to the annular portion 16. With this arrangement the annular portion 172 of sleeve 156 surrounds the lower portion of valve body annular portion 16 and the semiannular portion 174 of the sleeve 156 surrounds the upper end portion 160 of annular portion 16. The recesses or indentations 152 of the metal sleeve 156 are engaged with the longitudinally extending grooves 158 of the annular portion 16. The ball plunger 144, as illustrated in FIG. 4, is urged by the spring 150 into the metal sleeve recesses 152.

The recesses 152 of metal sleeve 156 and the grooves 158 of the annular portion 16 serve as an actuator stop mechanism for rotational movement of the actuator cap 90 on the valve body annular portion 16. Preferably the interlocking pairs of recesses 152 and grooves 158 are spaced 90° apart. This permits operation of the valve actuator 30 to be limited to 90° for moving the valve disc 26 between the open and closed positions. However, in the event the valve actuator 30 is over-torqued, and the above described actuator stop mechanism should fail, the valve actuator 30 is operable to provide 360° operation of the valve assembly 10 and continue to permit rotation of the valve stem 28 and valve disc 26 by the valve actuator cap 30. This feature of the present invention permits continued operation of the valve assembly 10 without a failure of the boundary pressure.

Further in accordance with the present invention, the metal annular support member 154 is operable to withstand the torque which would normally result in failure of the actuator stop mechanism. In addition, the provision of the metal sleeve 156 serves to reinforce the valve body annular portion 16. This is particularly advantageous for the valve assembly 10 of the present invention which is fabricated of plastic material. Ordinarily, to strengthen the plastic annular portion 16, the annular portion 16 would have to be substantially enlarged to withstand the torque applied thereto by the valve actuator 30. However, with the provision of the metal sleeve 156 having the tabs 176 and 178 secured to the polyethylene annular portion 16, the rotational forces generated by turning the valve actuator 30 are distributed along the entire length of the metal sleeve 156. This provides the valve assembly 10 with the necessary strength for sustained operation without having to construct a valve assembly having a substantially enlarged valve body annular portion.

According to the provisions of the patent statutes, we have explained the principle, preferred construction and mode of operation of our invention and have illustrated and described what we now consider to represent its best embodiment. However, it should be understood that, within the scope of the appended claims, the invention may be practiced otherwise than as specifically illustrated and described.

We claim:

1. A valve assembly comprising, a valve body of plastic material, said valve body having a conduit portion and an annular portion extending upwardly from said conduit portion, a passageway extending through said conduit portion for the conveyance of fluid through said conduit portion, a valve seat positioned in said passageway and secured to said conduit portion surrounding said passageway, a valve disc centrally positioned in said conduit portion for movement into and out of sealing relation with said valve seat to effect closing and opening of said valve assembly, actuating means supported by said valve body annular portion and connected to said valve disc for moving said valve disc between an open position and a closed position in said passageway, a valve stem rotatably supported in said valve body annular portion, said valve stem including an upper end portion nonrotatably connected to said actuating means, a lower end portion, and an intermediate portion, said valve disc having a bore, said intermediate portion of said valve stem having a cross section conforming to said bore cross section, a shoulder portion formed on said valve disc in surrounding relation with said bore, the lower end portion of said valve stem extending, when assembled, into said valve seat, said valve stem lower end portion extending into said valve disc bore, said valve stem lower end portion being wedge shaped to thereby provide an interference fit with said bore, and said valve disc bore being elastically deformed by said valve stem wedge shaped end portion to permit said valve stem wedge shaped end portion to be advanced through said bore into engagement with said disc shoulder to nonrotatably connect said valve disc to said valve stem and prevent withdrawal of said valve stem from said valve disc bore of noncircular cross section extending substantially through the diameter of said valve disc.

2. A valve assembly as set forth in claim 1 in which, said valve seat includes a metallic sleeve, said metallic sleeve having an outer peripheral edge, a plurality of grooves extending around said metallic sleeve on said outer peripheral edge, a resilient, expandable annular seal member positioned in each of said grooves, said seal members each being positioned in said respective grooves in an expanded state to securely grip said metallic sleeve, and said valve body plastic material being molded in surrounding relation with said seal members to embed said seal members in said plastic material to form a fluid tight seal between said metallic sleeve and said valve body conduit portion.

3. A valve assembly as set forth in claim 1 in which, said valve seat includes a metallic sleeve molded in sealing relation to said conduit portion, an annular resilient sleeve insert secured to said metallic sleeve and positioned within said passageway, said annular resilient sleeve insert having an outer peripheral surface, said metallic sleeve having an inner peripheral surface arranged to receive said outer peripheral surface of said annular resilient sleeve insert, and interlocking means provided on said sleeve inner peripheral surface and on said resilient sleeve insert outer peripheral surface for sealingly engaging together said inner and outer peripheral surfaces to prevent separation of said metallic sleeve from said annular resilient sleeve insert.

4. A valve assembly comprising, a valve body, said valve body having a conduit portion and an annular portion extending upwardly from said conduit portion, a passageway extending through said conduit portion for the conveyance of fluid through said conduit portion, a valve seat positioned in said passageway and secured to said conduit portion surrounding said passageway, a valve disc centrally positioned in said conduit portion for movement into and out of sealing engagement with said valve seat to effect closing and opening of said valve assembly, actuating means supported by said valve body annular portion and connected to said valve disc for moving said valve disc between an open position and a closed position, a metal support sleeve positioned in surrounding relation with said valve body annular portion to reinforce said valve body annular portion, interlocking means on said metal support sleeve and said valve body annular portion for nonrotatably connecting said metal support sleeve to said valve body annular portion, said valve body annular portion having at least one vertical planar surface, and said metal support sleeve having a tab secured to said valve body annular portion and abutting said vertical planar surface to permit the rotational forces generated upon turning of said actuating means to be transmitted from said valve body annular portion to said metal support sleeve.

5. A valve assembly as set forth in claim 4 in which, said valve body is fabricated of plastic material, said valve seat including a metallic sleeve, said metallic sleeve having an outer peripheral edge, a plurality of grooves extending around said metallic sleeve on said outer peripheral edge, a resilient, expandable annular seal member positioned in each of said grooves, said seal members each being positioned in said respective grooves in an expanded state to securely grip said metallic sleeve, and said valve body plastic material being molded in surrounding relation with said seal members to embed said seal members in said plastic material to form a fluid tight seal between said metallic sleeve and said valve body conduit portion.

6. A valve assembly as set forth in claim 4 in which, said valve seat includes a metallic sleeve molded in sealing relation to said conduit portion,
an annular resilient sleeve insert secured to said metallic sleeve and positioned within said passageway,
said annular resilient sleeve having an outer peripheral surface,
said metallic sleeve having an inner peripheral surface arranged to receive said outer peripheral surface of said annular resilient sleeve insert, and
interlocking means provides on said sleeve inner peripheral surface and on said resilient sleeve insert outer peripheral surface for sealingly engaging together said inner and outer peripheral surfaces to prevent separation of said metallic sleeve from said annular resilient sleeve insert.

7. A valve assembly comprising,
a valve body of plastic material,
said valve body having a conduit portion and an annular portion extending upwardly from said conduit portion,
a passageway extending through said conduit portion for the conveyance of fluid through said conduit portion,
a valve seat positioned in said passageway and secured to said conduit portion surrounding said passageway,
a valve disc centrally positioned in said conduit portion for movement into and out of engagement with said valve seat to effect closing and opening of said valve assembly,
actuating means supported by said valve body annular portion and connected to said valve disc for moving said valve disc between an open position permitting fluid flow through said passageway and a closed position interrupting fluid flow through said passageway,
a metal support sleeve positioned in surrounding relation with said valve body annular portion to reinforce said plastic material of said valve body annular portion,
said metal support sleeve and said valve body annular portion having planar surfaces engaged in abutting relation to prevent rotational movement of said metal support sleeve on said valve body annular portion,
interlocking means on said metal support sleeve and said actuating means for stopping relative rotational movement of said actuating means and said valve disc after rotational movement of said actuating means through a preselected angle on said metal support sleeve to selectively position said valve disc in said passageway,
said metal support sleeve being operable to permit the rotational forces generated upon turning of said actuating means to be transmitted from said valve body annular portion to said metal support sleeve, and
said interlocking means being operable to fail upon the application of a preselected torque thereto while said metal support sleeve withstands said preselected torque to prevent failure of said plastic material of said valve body annular portion and permit continued operation of said actuating means to open and close said valve assembly upon the application of excessive torque of said actuating means.

8. A valve assembly as set forth in claim 7 in which,
said valve seat includes a metallic sleeve,
said metallic sleeve having an outer peripheral edge,
a plurality of grooves extending around said metallic sleeve on said outer peripheral edge,
a resilient, expandable annular seal member positioned in each of said grooves,
said seal members each being positioned in said respective grooves in an expanded state to securely grip said metallic sleeve, and
said valve body plastic material being molded in surrounding relation with said seal members to embed said seal members in said plastic material to form a fluid tight seal between said metallic sleeve and said valve body conduit portion.

9. A valve assembly as set forth in claim 7 in which,
said valve seat includes a metallic sleeve molded in sealing relation to said conduit portion,
an annular resilient sleeve insert secured to said metallic sleeve and positioned within said passageway,
said annular resilient sleeve having an outer peripheral surface,
said metallic sleeve having an inner peripheral surface arranged to receive said outer peripheral surface of said annular resilient sleeve insert, and
interlocking means provided on said sleeve inner peripheral surface and on said resilient sleeve insert outer peripheral surface for sealingly engaging together said inner and outer peripheral surfaces to prevent separation of said metallic sleeve from said annular resilient sleeve insert.

10. A valve assembly comprising,
a valve body of plastic material,
said valve body having a conduit portion and an annular portion extending upwardly from said conduit portion,
a passageway extending through said conduit portion for the conveyance of fluid through said conduit,
a valve seat positioned in said passageway and secured to said conduit portion surrounding said passageway,
said valve seat including a metallic sleeve member,
said metallic sleeve having an outer peripheral edge,
a plurality of circumferential grooves extending around said metallic sleeve on said outer peripheral edge,
a resilient, expandable annular seal member positioned in each of said grooves, said seal members being undersized with respect to said grooves so that said seal members are stretched when in position in said grooves to securely grip said metallic sleeve member and prevent displacement of said seal members from said grooves during molding of said valve body around said metallic sleeve,
said valve body plastic material being molded in surrounding relation with said seal members to embed said seal members in said plastic material to form a fluid tight seal between said metallic sleeve and said valve body conduit portion,
an annular resilient sleeve insert secured to said metallic sleeve member and positioned within said passageway,
a valve disc centrally positioned in said conduit portion for movement into and out of sealing engagement with said annular resilient sleeve insert to effect closing and opening of said valve assembly,
actuating means supported by said valve body annular portion and connected to said valve disc for moving said valve disc between an open position permitting fluid flow through said passageway and a closed position sealingly engaging said valve disc with said annular resilient sleeve insert to interrupt fluid flow through said passageway, a valve stem rotatably supported in said valve body annular portion, said valve stem including an upper end portion nonrotatably connected to said actuating means and a lower end portion, said valve disc having a bore, a shoulder portion formed on said valve disc in surrounding relation with said bore, said valve stem lower end portion extending into said valve disc bore, said valve stem lower end portion being wedge shaped to thereby provide an interference fit with said bore, and said valve disc bore being elastically deformed by said valve stem wedge shaped end portion to permit said valve stem wedge shaped end portion to be advanced through said bore into engagement with said disc shoulder to nonrotatably connect said valve disc to said valve stem and prevent withdrawal of said valve stem from said valve disc bore.

11. A valve assembly comprising, a valve body of plastic material, said valve body having a conduit portion and an annular portion extending upwardly from said conduit portion, a passageway extending through said conduit portion for the conveyance of fluid through said conduit, a valve seat positioned in said passageway and secured to said conduit portion surrounding said passageway, said valve seat including a metallic sleeve member, said metallic sleeve having an outer peripheral edge, a plurality of circumferential grooves extending around said metallic sleeve on said outer peripheral edge, a resilient, expandable annular seal member positioned in each of said grooves, said seal members being undersized with respect to said grooves so that said seal members are stretched when in position in said grooves to securely grip said metallic sleeve member and prevent displacement of said seal members from said grooves during molding of said valve body around said metallic sleeve, said valve body plastic material being molded in surrounding relation with said seal members to embed said seal members in said plastic material to form a fluid tight seal between said metallic sleeve member and said valve body conduit portion, an annular resilient sleeve insert secured to said metallic sleeve member and positioned within said passageway, a valve disc centrally positioned in said conduit portion for movement into and out of sealing engagement with said annular resilient sleeve insert to effect closing and opening of said valve assembly, actuating means supported by said valve body annular portion and connected to said valve disc for moving said valve disc between an open position permitting fluid flow through said passageway and a closed position sealingly engaging said valve disc with said annular resilient sleeve insert to interrupt fluid flow through said passageway, a metal support sleeve positioned in surrounding relation with said valve body annular portion to reinforce said valve body annular portion, interlocking means on said metal support sleeve and said valve body annular portion for nonrotatably connecting said metal support sleeve to said valve body annular portion, said valve body annular portion having at least one vertical planar surface, and said metal support sleeve having a tab embedded in said plastic material of said valve body annular portion and abutting said vertical planar surface to permit the rotational forces generated upon turning of said valve actuating means to be transmitted from said valve body annular portion to said metal support sleeve.

12. A valve assembly comprising, a valve body of plastic material, said valve body having a conduit portion and an annular portion extending upwardly from said conduit portion, a passageway extending through said conduit portion for the conveyance of fluid through said conduit, a valve seat positioned in said passageway and secured to said conduit portion surrounding said passageway, said valve seat including a metallic sleeve member, said metallic sleeve having an outer peripheral edge, a plurality of circumferential grooves extending around said metallic sleeve on said outer peripheral edge, a resilient, expandable annular seal member positioned in each of said grooves, said seal members being undersized with respect to said grooves so that said seal members are stretched when in position in said grooves to securely grip said metallic sleeve member and prevent displacement of said seal members from said grooves during molding of said valve body around said metallic sleeve, said valve body plastic material being molded in surrounding relation with said seal members to embed said seal members in said plastic material to form a fluid tight seal between said metallic sleeve member and said valve body conduit portion, an annular resilient sleeve insert secured to said metallic sleeve member and positioned within said passageway, a valve disc centrally positioned in said conduit portion for movement into and out of sealing engagement with said annular resilient sleeve insert to effect closing and opening of said valve assembly, actuating means supported by said valve body annular portion and connected to said valve disc for moving said valve disc between an open position permitting fluid flow through said passageway and a closed position sealingly engaging said valve disc with said annular resilient sleeve insert to interrupt fluid flow through said passageway, said actuating means having a cup-shaped body portion positioned in surrounding relation with said valve body annular portion, said valve body annular portion having a groove extending around the external surface of said valve body annular portion to form a shoulder above said groove, an O-ring member securely retained in said groove and positioned in abutting relation with said actuating means body portion to provide a fluid tight seal between said actuating means and said valve body annular portion, a pin member extending through said actuating means body portion and into said groove between said valve body annular portion and said O-ring, and said pin member being wedged into frictional engagement with said shoulder and said O-ring to securely retain said actuating means on said valve body annular portion.

13. A valve assembly comprising, a valve body of plastic material, said valve body having a conduit portion and an annular portion extending upwardly from said conduit portion, a passageway extending through said conduit portion for the conveyance of fluid through said conduit, a valve seat positioned in said passageway and secured to said conduit portion surrounding said passageway, said valve seat including a metallic sleeve member, said metallic sleeve having an outer peripheral edge, a plurality of circumferential grooves extending around said metallic sleeve on said outer peripheral edge, a resilient, expandable annular seal member positioned in each of said grooves, and seal members being undersized with respect to said grooves so that said seal members are stretched when in position in said grooves to securely grip said metallic sleeve member and prevent displacement of said seal members from said grooves during molding of said valve body around said metallic sleeve, said valve body plastic material being molded in surrounding relation with said seal members to embed said seal members in said plastic material to form a fluid tight seal between said metallic sleeve member and said valve body conduit portion, an annular resilient sleeve insert secured to said metallic sleeve member and positioned within said passageway, a valve disc centrally positioned in said conduit portion for movement into and out of sealing engagement with said annular resilient sleeve insert to effect closing and opening of said valve assembly, actuating means supported by said valve body annular portion and connected to said valve disc for moving said valve disc between an open position permitting fluid flow through said passageway and a closed position sealingly engaging said valve disc with said annular resilient sleeve insert to interrupt fluid flow through said passageway, a metal support sleeve position in surrounding relation with said valve body annular portion to reinforce said valve body annular portion, said actuating means being rotatably positioned on said metal support sleeve, said metal support sleeve having a plurality of recesses radially spaced from one another, and a spring actuated device retained in said actuating means and normally biased to engage one of said plurality of metal support sleeve recesses to maintain said actuating means in a preselected position corresponding to a preselected position of said valve disc in said conduit portion.

14. A valve assembly comprising, a valve body of plastic material, said valve body having a conduit portion and an annular portion extending upwardly from said conduit portion, a passageway extending through said conduit portion for the conveyance of fluid through said conduit, a valve seat positioned in said passageway and secured to said conduit portion surrounding said passageway, said valve seat including a metallic sleeve member, said metallic sleeve having an outer peripheral edge, a plurality of circumferential grooves extending around said metallic sleeve on said outer peripheral edge, a resilient, expandable annular seal member positioned in each of said grooves, said seal members being undersized with respect to said grooves so that said seal members are stretched when in position in said grooves to securely grip said metallic sleeve member and prevent displacement of said seal members from said grooves during molding of said valve body around said metallic sleeve, said valve body plastic material being molded in surrounding relation with said seal members to embed said seal members in said plastic material to form a fluid tight seal between said metallic sleeve member and said valve body conduit portion, an annular resilient sleeve insert secured to said metallic sleeve member and positioned within said passageway, a valve disc centrally positioned in said conduit portion for movement into and out of sealing engagement with said annular resilient sleeve insert to effect closing and opening of said valve assembly, and actuating means supported by said valve body annular portion and connected to said valve disc for moving said valve disc between an open position permitting fluid flow through said passageway and a closed position sealingly engaging said valve disc with said annular resilient sleeve insert to interrupt fluid flow through said passageway.

15. A valve assembly as set forth in claim 14 which includes, said metallic sleeve member having an inner diameter portion with a constricted annular opening thereto, said annular resilient sleeve insert being fabricated of an elastomeric material and having an outer diameter portion, said sleeve insert outer diameter portion being positioned within said sleeve member constricted annular opening, and said sleeve insert outer diameter portion being vulcanized to said sleeve member inner diameter portion to prevent separation of said sleeve insert from an annular configuration.

16. A valve assembly as set forth in claim 15 which includes, said annular resilient sleeve insert being vulcanized to said metallic sleeve member, and said metallic sleeve member with said annular resilient sleeve insert being vulcanized thereto secured to said valve body within said conduit portion by molding of said valve body in surrounding relation with said metallic sleeve member.

17. A valve assembly as set forth in claim 14 which includes, means for locking said metallic sleeve member to said plastic valve body to prevent separation of said metallic sleeve member from said plastic valve body during sustained fluid pressure in said passageway, said means for locking said metallic sleeve member to said plastic valve body including annular protrusions extending outwardly from said metallic sleeve member, and said annular protrusions being embedded in locking engagement with said plastic material of said valve body to prevent separation of the surface of said valve body away from the surface of said metallic sleeve member and maintain engagement of said metallic sleeve member with said plastic valve body during sustained periods of fluid flow through said passageway at elevated pressures.

18. A valve assembly as set forth in claim 14 which includes, a valve stem extending through said valve body annular portion, said valve stem having a first end portion nonrotatably connected to said valve disc and a second end portion projecting from said valve body annular portion, said valve stem second end portion having an enlarged section and a reduced section, said actuating means being molded to said enlarged and reduced sections to form an integral valve stem and actuating means, and said actuating means being fabricated of plastic material and nonrotatably connected to said valve stem second end portion by molded engagement with said enlarged and reduced sections to form an integral valve stem and actuating means for rotating said valve stem by rotating said actuating means relative to said valve body annular portion.

19. A valve assembly as set forth in claim 14 in which, said seal members are compressed onto said metallic sleeve member by said valve body conduit portion upon molding of the plastic material around said metallic sleeve member so that said stretched seal members are retained in sealing engagement with said metallic sleeve member to prevent separation from said metallic sleeve member when said valve body portion is subjected to differential temperatures and pressures to prevent fluid leakage between said metallic sleeve member and said valve body conduit portion.

20. A connection of a valve stem to a valve disc comprising, a valve body, a passageway extending through said valve body for the conveyance of fluid through said valve body, a valve seat positioned in said passageway, a valve disc centrally positioned in said passageway for movement into and out of sealing relation with said valve seat, a valve stem rotatably supported in said valve body, said valve disc having a bore of noncircular cross section extending substantially through the diameter of said valve disc, a shoulder portion formed on said valve disc in surrounding relation with the said bore, said valve stem having a lower end portion extending into said valve disc bore and an intermediate portion, said intermediate portion of said valve stem having a cross section conforming to said bore cross section said valve stem lower end portion being wedge shaped to thereby provide an interference fit with said bore, and said valve disc bore being elastically deformed by said valve stem wedge shaped end portion to permit said valve stem wedge shaped end portion to be advanced through said bore into engagement with said disc shoulder to nonrotatably connect said valve disc to said valve stem and prevent withdrawal of said valve stem from said valve disc bore the lower end portion of said valve stem extending, when assembled, into said valve seat.

* * * * *